(12) United States Patent
Kuroda et al.

(10) Patent No.: US 7,016,773 B2
(45) Date of Patent: Mar. 21, 2006

(54) CONTROL SYSTEM FOR HYBRID VEHICLE

(75) Inventors: Shigetaka Kuroda, Saitama-ken (JP);
Takashi Kamimura, Saitama-ken (JP);
Hiroshi Murakami, Saitama-ken (JP);
Akihito Ohtsu, Saitama-ken (JP);
Kiyoshi Asami, Saitama-ken (JP);
Naoki Tsuji, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/897,076

(22) Filed: Jul. 23, 2004

(65) Prior Publication Data

US 2005/0027413 A1 Feb. 3, 2005

(30) Foreign Application Priority Data

Aug. 1, 2003 (JP) ............................. 2003-205482

(51) Int. Cl.
*B60K 6/00* (2006.01)
*B60L 9/00* (2006.01)
(52) U.S. Cl. ..................... 701/22; 180/65.2; 318/139
(58) Field of Classification Search ................ 701/22; 180/65.2, 65.3, 65.1, 65.4, 65.8; 318/139, 318/140; 320/103, 104, 145, 162
See application file for complete search history.

(56) References Cited

U.S. PATENT DOCUMENTS

| 6,295,487 | B1 * | 9/2001 | Ono et al. ..................... 701/22 |
| 6,752,226 | B1 * | 6/2004 | Naito et al. ................. 180/65.3 |
| 6,766,874 | B1 * | 7/2004 | Naito et al. ................. 180/65.3 |
| 2004/0063535 | A1 * | 4/2004 | Ibaraki ........................... 477/3 |
| 2004/0232861 | A1 * | 11/2004 | Wakashiro et al. ......... 318/139 |

* cited by examiner

*Primary Examiner*—Thomas G. Black
*Assistant Examiner*—Dalena Tran
(74) *Attorney, Agent, or Firm*—Westerman, Hattori, Daniels & Adrian, LLP

(57) ABSTRACT

A control system for a hybrid vehicle, which enables the hybrid vehicle to optimally selectively use driven modes to attain excellent fuel economy and thereby make it possible to improve fuel economy. The hybrid vehicle is operated in an engine-driven mode or a motor-driven mode, and recovers electric energy for driving an electric motor, using the output from the engine. The control system calculates a driving fuel consumption amount of the engine required for driving the hybrid vehicle in the engine-driven mode and a recovering fuel consumption amount of the engine required for recovering electric energy to be consumed when the hybrid vehicle is driven in the motor-driven mode, and sets the driven mode to the motor-driven mode when the recovering fuel consumption amount is smaller than the driving fuel consumption amount, and to the engine-driven mode when the former is larger than the latter.

8 Claims, 10 Drawing Sheets

| VALVE OPERTING MODE | 1ST INTAKE VALVE IV1 | 2ND INTAKE VALVE IV2 | EXHASUT VALVE |
|---|---|---|---|
| NORMAL MODE (VTMOD2) | NORMAL | NORMAL | NORMAL |
| RETARDED-CLOSING MODE (VTMOD1) | RETARDED-CLOSING | IDLE | NORMAL |
| IDLE MODE (VTMODCS) | IDLE | IDLE | IDLE |

F I G. 1 1
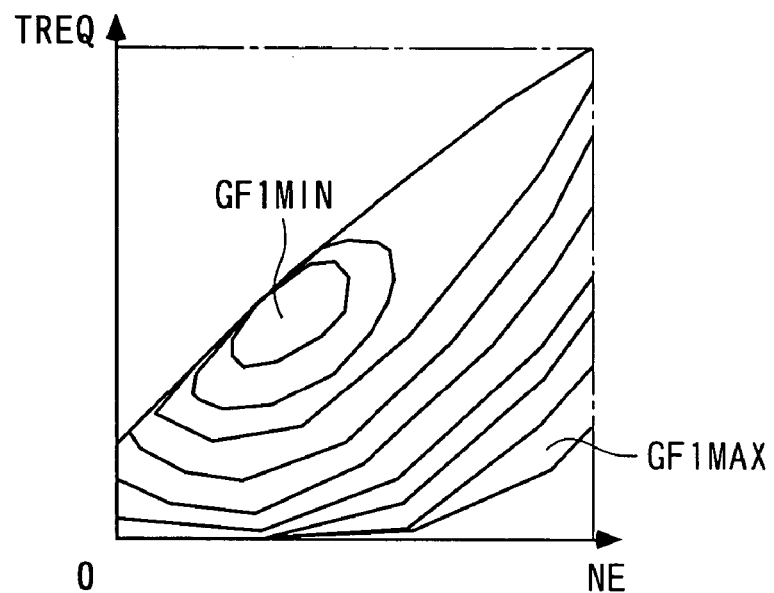
F I G. 1 2
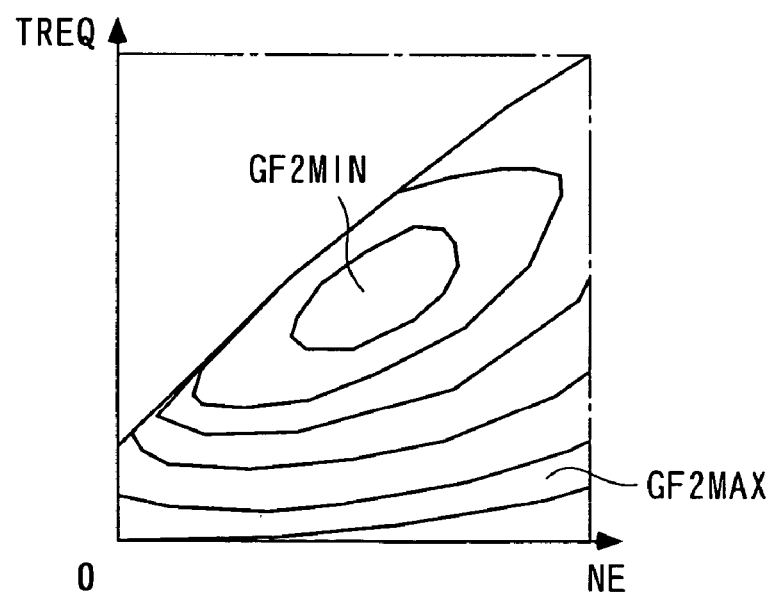

CONTROL SYSTEM FOR HYBRID VEHICLE

BACKGROUND OF THE INVENTION

1. Field of the Invention

The present invention relates to a control system for a hybrid vehicle that is driven by an internal combustion engine and an electric motor, and is capable of recovering electric energy for driving the electric motor, using the output from the engine.

2. Description of the Related Art

Conventionally, a control system of this kind has been proposed e.g. in Japanese Laid-Open Patent Publication (Kokai) No. 2002-242718. This control system is configured such that the vehicle is driven by the engine during normal operation of the vehicle, such as cruising, and when the degree of increase in the throttle valve opening is large, the vehicle is driven not only by the engine but also by the electric motor n an auxiliary manner so as to ensure the feeling of acceleration. Further, depending on the operating conditions of the engine, the electric motor operates as a generator to generate electric energy using the output from the engine to thereby charge a battery as the drive source of the electric motor with the generated electric energy.

This kind of hybrid vehicle aims to attain excellent fuel economy as one of its goals, and to attain this goal, it is necessary to operate the engine while properly selecting between an engine-driven mode in which the vehicle is driven by the engine and a motor-driven mode in which the vehicle is driven by the electric motor. However, the magnitude relationship between the fuel consumption in the engine-driven mode and that in the motor-driven mode during which recovery of electric energy is additionally carried out is not definite but varies with the operating conditions of the engine. To comply with this varying relationship between the fuel consumption in the engine-driven mode and that in the motor-driven mode, the proposed control system only selects the use of the engine-driven mode during the normal operation, such as cruising, and the combined use of the engine-driven mode and the motor-driven mode e.g. during acceleration. This roughly selective use of the two modes cannot attain desired excellent fuel economy.

SUMMARY OF THE INVENTION

It is an object of the invention to provide a control system for a hybrid vehicle, which enables the hybrid vehicle to optimally selectively use driven modes to attain excellent fuel economy and thereby make it possible to improve fuel economy.

To attain the above object, the present invention provides a control system for a hybrid vehicle that is operated while switching a driven mode between an engine-driven mode in which the hybrid vehicle is driven by an internal combustion engine and a motor-driven mode in which the hybrid vehicle is driven by an electric motor, and is capable of recovering electric energy for driving the electric motor, using the output from the engine, during the engine-driven mode, the control system comprising:

operating condition-detecting means for detecting operating conditions of the hybrid vehicle;

driving fuel consumption amount-calculating means for calculating a driving fuel consumption amount of the engine required for driving the hybrid vehicle in the engine-driven mode, based on the detected operating conditions of the hybrid vehicle;

recovering fuel consumption amount-calculating means for calculating a recovering fuel consumption amount of the engine required for recovering electric energy to be consumed when the hybrid vehicle is driven in the motor-driven mode, based on the detected operating conditions of the hybrid vehicle; and driven mode-setting means responsive to a result of comparison between the recovering fuel consumption amount calculated by the recovering fuel consumption amount-calculating means and the driving fuel consumption amount calculated by the driving fuel amount-calculating means, for setting the driven mode to the motor-driven mode when the recovering fuel consumption amount is smaller than the driving fuel consumption amount, and to the engine-driven mode when the recovering fuel consumption amount is larger than the driving fuel consumption amount.

With the arrangement of the control system for a hybrid vehicle according to the present invention, based on the detected operating conditions of the hybrid vehicle, there are calculated the driving fuel consumption amount required for driving the hybrid vehicle in the engine-driven mode and the recovering fuel consumption amount required for recovering electric energy to be consumed when the hybrid vehicle is driven in the motor-driven mode. Then, the recovering fuel consumption amount and the driving fuel consumption amount are compared with each other, and if the former is smaller than the latter, the driven mode is set to the motor-driven mode, whereas if the former is larger than the latter, the same is set to the engine-driven mode. By setting the driven mode by comparing net amounts of fuel to be consumed in the respective driven modes, as described above, it is possible to optimally select one of the driven modes which gives the more excellent fuel economy, improving fuel economy.

Preferably, the engine is configured such that the engine is selectively driven in one of a plurality of operating modes which give respective different fuel consumption ratios, and the driving fuel consumption amount-calculating means calculates a plurality of driving fuel consumption amounts for the respective operating modes, as the driving fuel consumption amount, the driven mode-setting means using a smallest one of the plurality of driving fuel consumption amounts calculated by the driving fuel consumption amount-calculating means, as the driving fuel consumption amount to be compared with the recovering fuel consumption amount.

With the arrangement of this preferred embodiment of the present invention, driving fuel consumption amounts are calculated for a plurality of operating modes of the engine, respectively, and the smallest one of these driving fuel consumptions amounts is compared with the recovering fuel consumption amount. By thus using the smallest one of the driving fuel consumption amounts as the driving fuel consumption amount to be compared with the recovering fuel consumption amount, it is possible to perform determination of the driven mode based on the result of comparison between the driving fuel consumption amount and the recovering fuel consumption amount while taking the operating mode into account such that more excellent fuel economy can be obtained, in a more fine-grained manner, and therefore further improve fuel economy.

More preferably, the recovering fuel consumption amount-calculating means calculates a plurality of recovering fuel consumption amounts for the respective operating modes, as the recovering fuel consumption amount, and the driven mode-setting means uses a smallest one of the plurality of recovering fuel consumption amounts calculated by the recovering fuel consumption amount-calculating means, as the recovering fuel consumption amount to be compared with the driving fuel consumption amount.

With the arrangement of this preferred embodiment of the present invention, recovering fuel consumption amounts are calculated for the respective operating modes of the engine, and the smallest one of these recovering fuel consumptions amounts is compared with the driving fuel consumption amount. By thus using the smallest one of the recovering fuel consumption amounts as the recovering fuel consumption amount to be compared with the driving fuel consumption amount, as well, it is also possible to determine the driven mode while taking the operating mode into account such that more excellent fuel economy can be obtained, in a still more fine-grained manner, and therefore still further improve fuel economy.

Preferably, the recovering fuel consumption amount-calculating means calculates the recovering fuel consumption amount such that load on the engine necessary for recovering the electric energy does not exceed a predetermined value.

With the arrangement of this preferred embodiment, since the recovery of the electric energy is carried out using the output from the engine, if an additional load placed on the engine for recovery of the electric energy becomes excessive, drivability and the like are more likely to be degraded, and therefore there is a limit to the additional load that can be placed on the engine for the recovery. With the arrangement of the preferred embodiment, however, the recovering fuel consumption amount is calculated such that load on the engine does not exceed a predetermined value during the recovery of the electric energy, and therefore by setting the predetermined value to a value corresponding to the limit, it is possible to appropriately calculate the recovering fuel consumption amount.

More preferably, the engine has an intake valve, and the plurality of operating modes includes a normal operating mode in which the intake valve is actuated such that the intake valve closes in normal closing timing, and a retarded-closing operating mode in which the intake valve is actuated such that the intake valve closes in timing more retarded than in the normal operating mode.

Preferably, the operating conditions of the vehicle based on which the recovering fuel consumption amount and the driving fuel consumption amount are calculated include a rotational speed of the engine and torque demanded of the engine.

The above and other objects, features, and advantages of the invention will become more apparent from the following detailed description taken in conjunction with the accompanying drawings.

BRIEF DESCRIPTION OF THE DRAWINGS

FIG. 11 is a diagram showing an example of a GF1 map for use in the control process (FIG. 7 and FIG. 8 parts); and FIG. 12 is a diagram showing an example of a GF2 map for use in the control process (FIG. 7 and FIG. 8 parts).

DETAILED DESCRIPTION OF THE PREFERRED EMBODIMENTS

Figure 1:
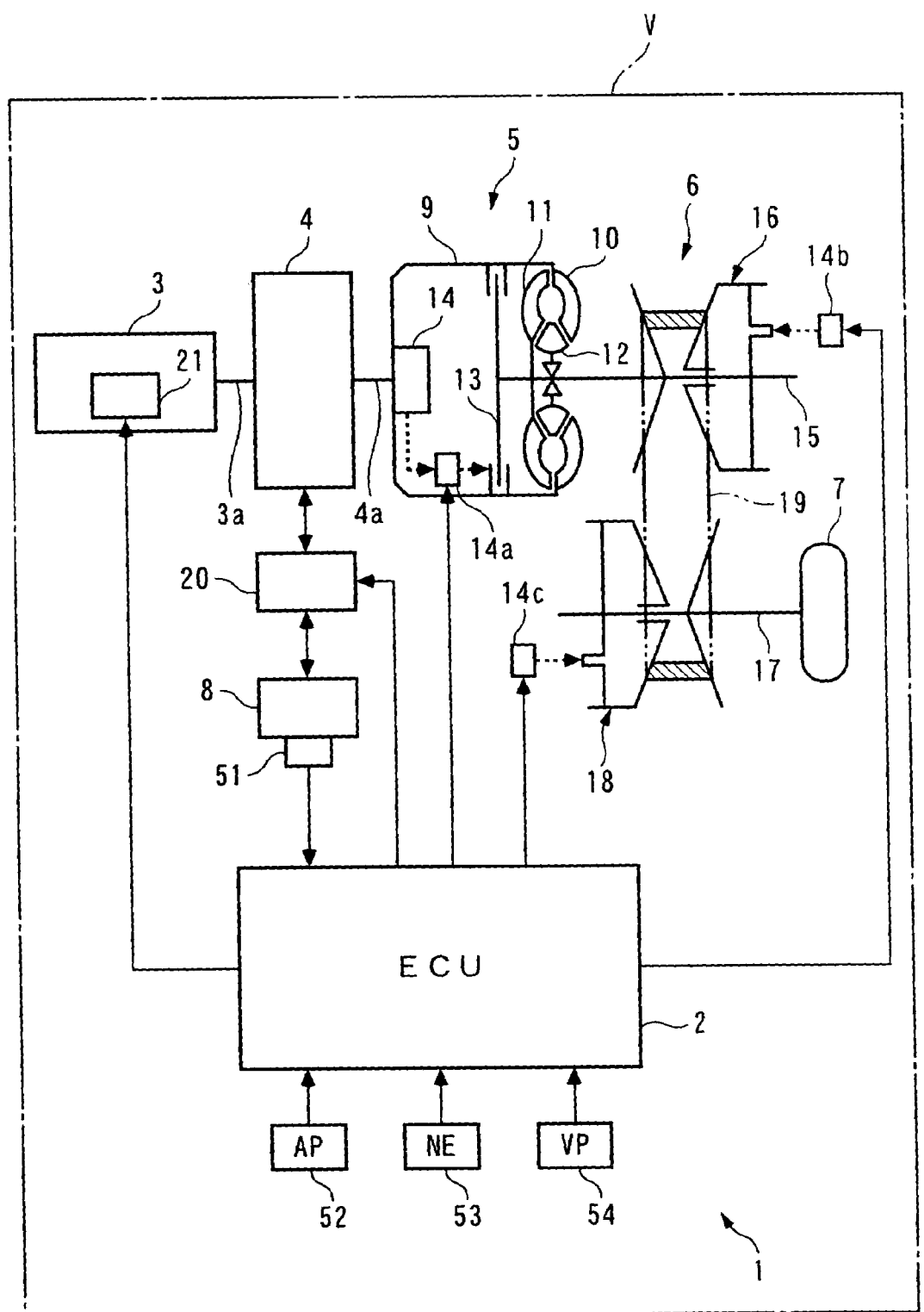
FIG. 1 is a block diagram schematically showing the arrangement of a control system according to the present invention and a vehicle to which is applied the control system.

The invention will now be described in detail with reference to the drawings showing a vehicle (hybrid vehicle) to which is applied a control system 1 according to a preferred embodiment of the present invention.

The vehicle V is equipped with an internal combustion engine (hereinafter referred to as "the engine") 3 and an electric motor 4, and is operated while switching a driven mode thereof between an engine-driven mode in which the vehicle V is driven by the engine 3 and a motor-driven mode in which the vehicle V is driven by the electric motor 4. The engine 3 has a crankshaft 3a thereof directly connected to an output shaft 4a of the electric motor 4, and the crankshaft 3a is connected to driving wheels 7 of the vehicle 4 via the output shaft 4a of the electric motor 4, a torque converter 5, a continuously variable transmission 6, and so forth.

The electric motor 4 is connected to a battery 8 as a drive source via a power drive unit (hereinafter referred to as "the PDU") 20, which is formed by an electric circuit comprised of an inverter. Further, the electric motor 4 also serves as a generator that carried out power generation using the output from the engine 3. The electric energy generated by the electric motor 4 charges the battery 8 via the PDU 20. Further, the electric motor 4 is connected to an ECU 2 via the PDU 20.

The battery 8 is provided with a current-voltage sensor 51 which detects current and voltage values of electric current inputted to and outputted from the battery 8, and delivers signals indicative of the detected current and voltage values to the ECU 2. The ECU 2 calculates a remaining charge QBAT of the battery 8.

The torque converter 5 transmits the driving force using a hydraulic fluid filled therein. More specifically, the torque converter 5 is comprised of a converter cover 9 in the form of a case connected to the output shaft 4a of the electric motor 4, a pump impeller 10 mounted on the converter cover 9, a turbine runner 11 connected to a main shaft 15 of the continuously variable transmission 6, a stator 12, and a lockup clutch 13.

The pump impeller 10, the turbine runner 11, and the stator 12 are all formed by impellers. Further, the pump impeller 10 and the turbine runner 11 are disposed within the converter cover 9 such that they are opposed to each other with a slight gap therebetween, whereby the torque transmitted to the pump impeller 10 from the output shaft 4a is transmitted by the hydraulic fluid to the turbine runner 11. Further, the stator 12 is disposed between respective inner peripheries of the pump impeller 10 and the turbine runner 11, for increasing the torque transmitted from the pump impeller 10 to the turbine runner 11.

The lockup clutch 13 connects and disconnects between the converter cover 9 connected to the output shaft 4a and the main shaft 15 of the continuously variable transmission 6 by supply and stoppage of the hydraulic pressure thereto. The lockup clutch 13 is connected to an oil pump 14 which is driven by the torque of the output shaft 4a as the drive source thereof, via an oil passage, not shown. The oil passage has a hydraulic pressure control valve 14a disposed therein which carries out supply and stoppage of the hydraulic pressure to the lockup clutch 13 from the oil pump 14 under the control of the ECU 2.

The continuously variable transmission 6 is of a belt type, and comprised of a drive pulley 16 fitted on the main shaft 15, a counter shaft 17 connected to the driving wheels 7, a driven pulley 18 fitted on the counter shaft 17, a metal belt 19 extending around the pulleys 16 and 18, for transmitting the driving force of the former 16 to the latter 18.

The drive pulley 16 is configured such that the effective diameter thereof is variable, and is connected to the aforementioned oil pump 14 via an oil passage (not shown). The oil passage has a hydraulic pressure control valve 14b disposed therein, for controlling hydraulic pressure supplied to the drive pulley 16 under the control of the ECU 2. This sets the effective diameter of the drive pulley 16 to a value dependent on the hydraulic pressure.

The driven pulley 18 is constructed similarly to the drive pulley 16, and has the effective diameter thereof set to a value dependent on hydraulic pressure supplied thereto from the oil pump 14 and controlled by a hydraulic pressure control valve 14c under the control of the ECU 2. As described above, by setting the respective effective diameters of the pulleys 16 and 18, separately and continuously variably, the ratio between the rotational speed of the main shaft 15 and that of the counter shaft 17 can be continuously varied. The hydraulic pressure supplied from the oil pump 14 to the two pulleys 16 and 18 not only plays the role of changing the transmission ratio of the continuously variable transmission 6, but also serves to prevent transmission loss caused by slippage of the metal belt 19 on the pulleys 16 and 18.

Figure 2:
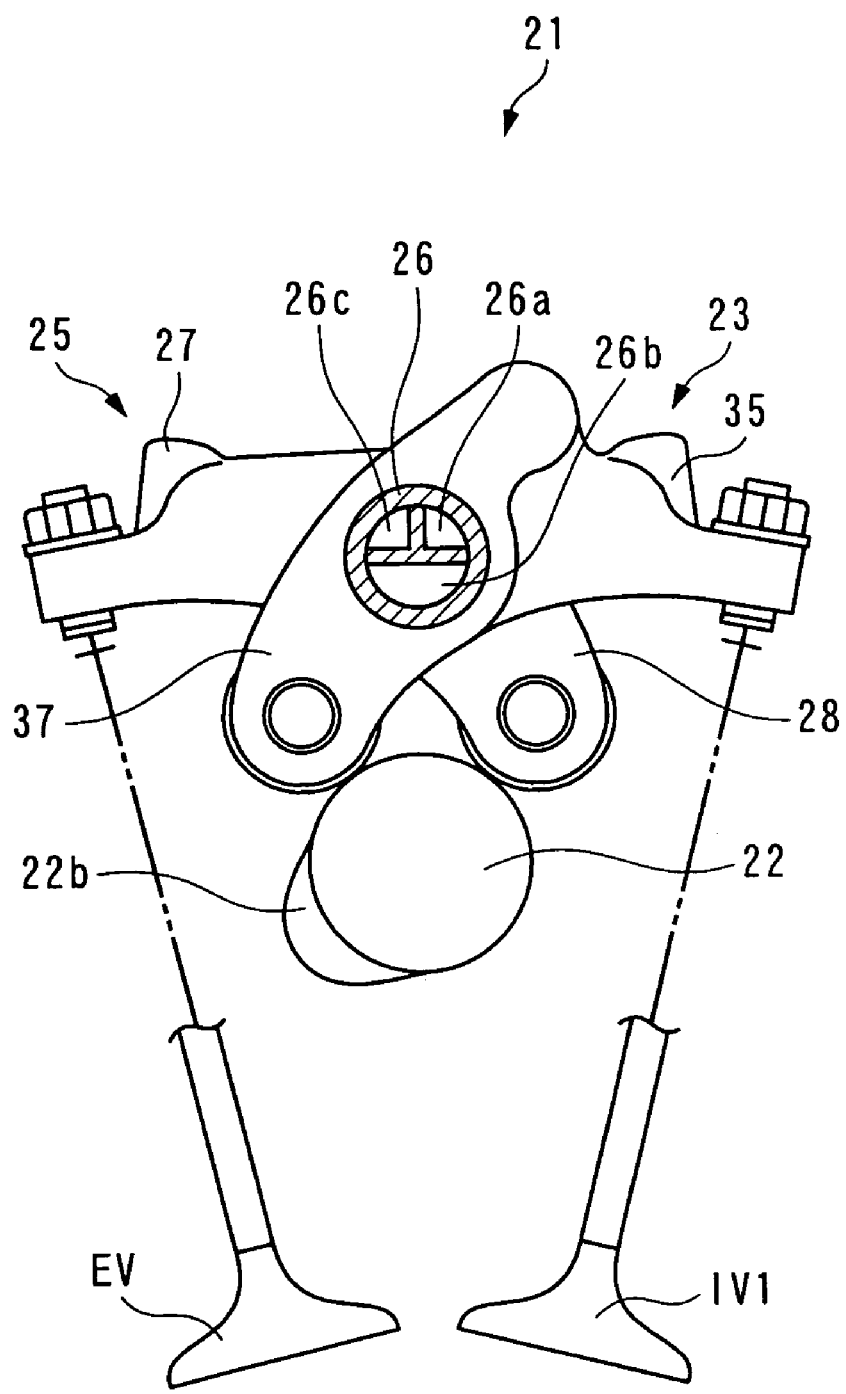
FIG. 2 is diagram schematically showing the arrangement of a valve-actuating mechanism, a first intake valve, and an exhaust valve.
Figure 3:
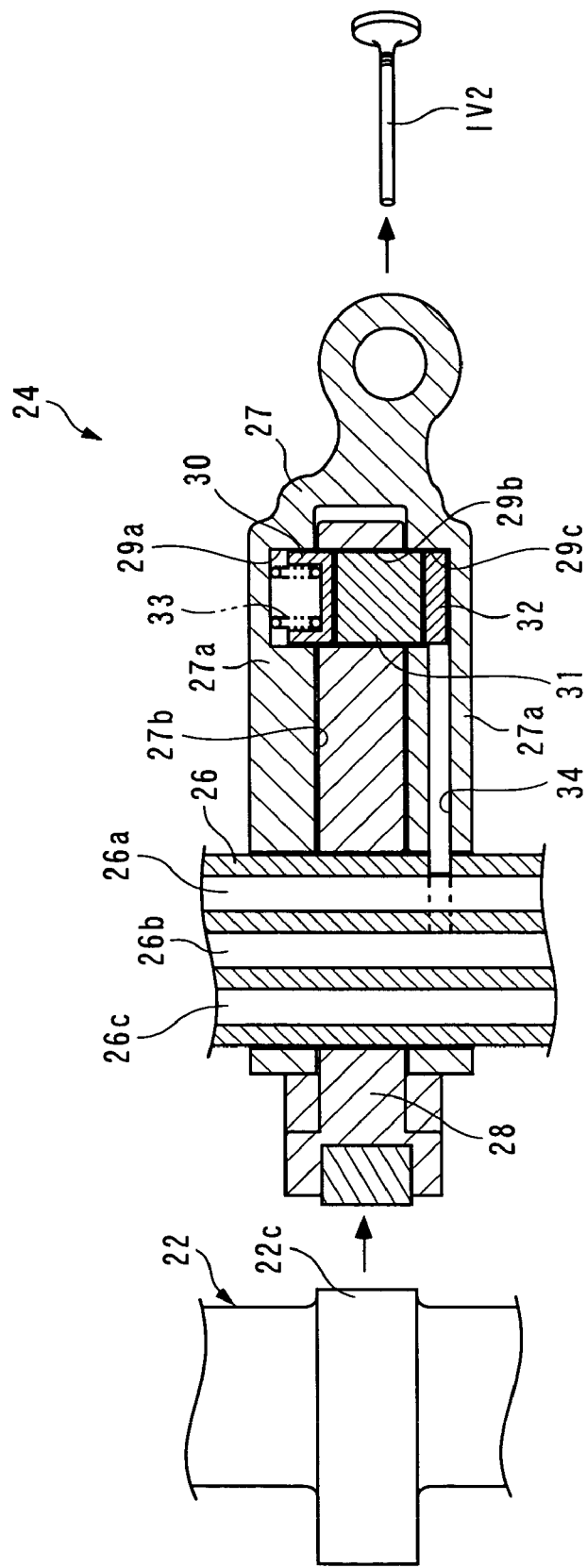
FIG. 3 is diagram schematically showing the arrangement of a second intake valve, a second intake rocker arm, and a camshaft.
Figure 4:
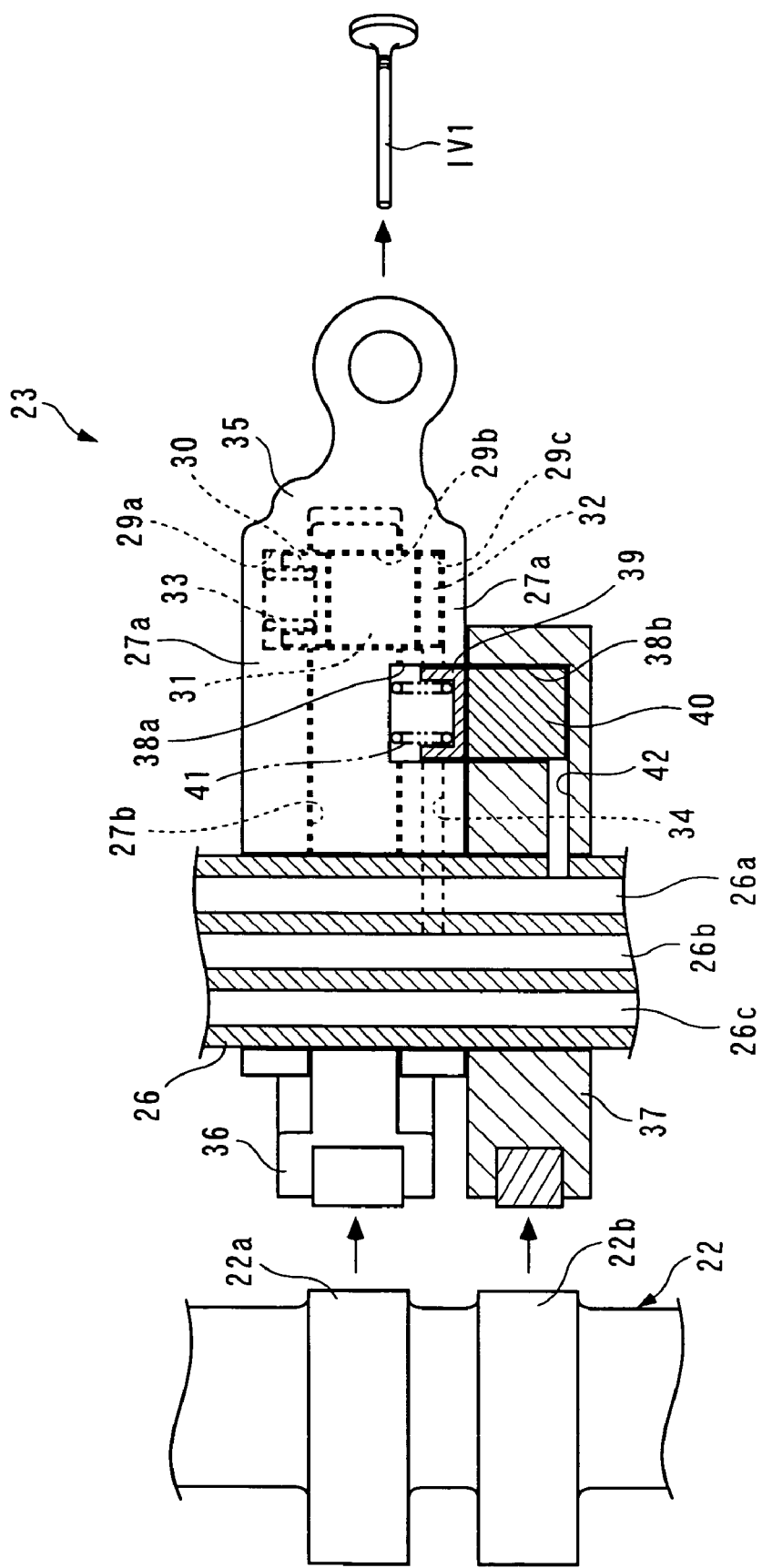
FIG. 4 is a diagram schematically showing the arrangement of the first intake valve, a first intake rocker arm, and the camshaft.

The engine 3 is e.g. a four-cycle four-cylinder SOHC gasoline engine, and includes a first intake valve IV1, a second intake valve IV2, and an exhaust valve EV, as shown in FIGS. 2 to 4. To actuate the first and second intake valves IV1 and IV2 and the exhaust valve EV, a valve-actuating mechanism 21 is provided. These valves IV1, IV2, and EV are urged by respective springs (not shown) provided therefor, in the valve-closing directions.

The valve-actuating mechanism 21 includes a camshaft 22 having a plurality of cams for actuating the first and second intake valves IV1 and IV2 and the exhaust valve EV, and a first intake rocker arm 23 and a second intake rocker arm 24, and an exhaust rocker arm 25, for transmitting the motions of the associated cams to the first and second intake valves EV1 and EV2 and the exhaust valve EV, respectively.

Figures 5, 6:
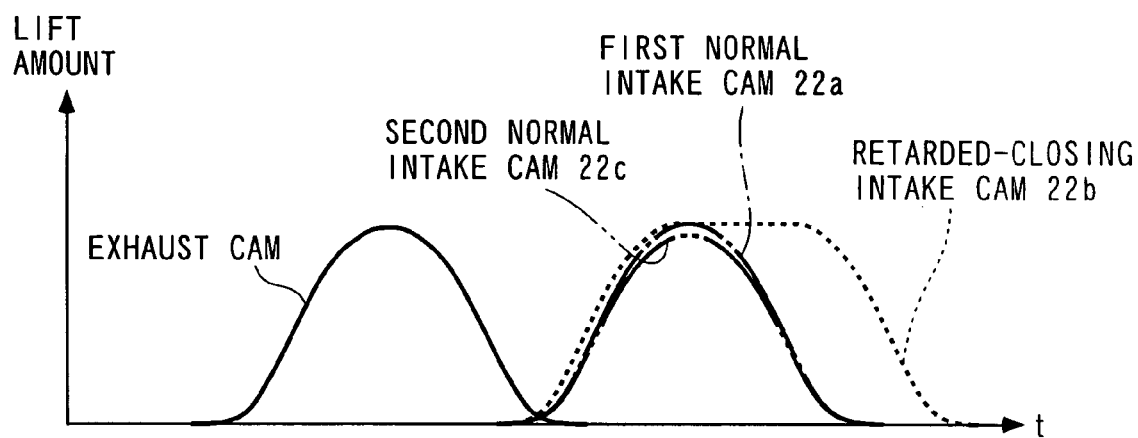
FIG. 5 is a diagram showing valve lift curves obtained when the valves are actuated using first and second normal intake cams, a retarded-closing intake cam, and an exhaust cam.
FIG. 6 is a diagram showing a table of valve operating modes and respective operating states of each valve in the valve operating modes.

The camshaft 22 is connected to the crankshaft 3a, and driven for rotation such that the camshaft 22 rotates through one turn per two turns of the crankshaft 3a. The camshaft 22 is integrally formed with a first normal intake cam 22a and a retarded-closing intake cam 22b for actuating the first intake valve IV1, a second normal intake cam 22c for actuating the second intake valve IV2, and an exhaust cam (not shown) for actuating the exhaust valve EV. As shown in FIG. 5, the first normal intake cam 22a, the second normal intake cam 22c, and the exhaust cam have cam profiles configured such that the cams are equal to each other in the difference between the respective cam phases of the valve-opening timing and the valve-closing timing of the associated valve, and similar to each other in valve lift curve. In contrast, the retarded-closing intake cam 22b has a cam profile configured such that the first intake valve IV1 is held at a full lift over a predetermined cam phase section, and makes the valve-closing timing of the first intake valve IV1 more retarded than the first normal intake cam 22a.

The first and second intake rocker arms 23 and 24 and the exhaust rocker arm 25 are rotatably supported on the rocker arm shaft 26. The rocker arm shaft 26 is fixed to a holder (not shown), and has first to third oil passages 26a, 26b, and 26c formed therethrough. These first to third oil passages 26a to 26c are connected to the oil pump 14, and hydraulic pressure control valves, not shown, are disposed between the respective oil passages and the oil pump 14. These hydraulic pressure control valves control supply and stoppage of the hydraulic pressure from the oil pump 14 to the oil passages under the control of the ECU 2.

As shown in FIG. 3, the second intake rocker arm 24 has a second valve-abutting portion 27 and a second cam-abutting portion 28 in the form of arms which are pivotally-movable about the rocker arm shaft 26. The second valve-abutting portion 27 is configured to have an inverted U shape in cross-section having a pair of side walls 27a and 27a and a top wall (not shown), with one end thereof in abutment with the upper end of the second intake valve IV2, and the other i.e. opposite end thereof rotatably supported by the rocker arm shaft 26. The second cam-abutting portion 28 has one end thereof in abutment with the second normal intake cam 22c, a central portion thereof pivotally supported by the rocker arm shaft 26, the other, i.e. opposite end-side portion thereof movable into and out of a recess 27b formed between the side walls 27a and 27a of the second valve-abutting portion 27.

Further, one side wall 27a of the second valve-abutting portion 27, the second cam-abutting portion 28, and the other side wall 27a of the second valve-abutting portion 27 are respectively formed with cylinders 29a to 29c in respective portions thereof closer to the second intake valve IV2 with respect to the rocker arm shaft 26. These cylinders 29a to 29c become continuous with each other when the second cam-abutting portion 28 is received into the recess 27b of the second valve-abutting portion 27. Further, within these cylinders 29a to 29c, connection pins 30 to 32 are slidably disposed, respectively, and within the cylinder 29a is disposed a return spring 33 for urging the connection pins 30 to 32 toward the cylinder 29c on the opposite side. Further, the other side wall 27a of the second valve-abutting portion 27 is formed with an oil passage 34 that communicates between the second oil passage 26b of the rocker arm shaft 26 and the cylinder 29c.

With the above configuration, when the hydraulic pressure is not supplied from the oil pump 14 to the cylinder 29c via the second oil passage 26b, the urging force of the return spring 33 causes the connection pins 30 to 32 to be positioned closer to the cylinder 29c, with the connection pin 30 being engaged with both the one wall 27a of the second valve-abutting portion 27 and the second cam-abutting portion 28 in a straddling manner and the connection pin 31 being engaged with both the second cam-abutting portion 28 and the other side wall 27a of the second valve-abutting portion 27 in a straddling manner (state shown in FIG. 3). This connects the second valve-abutting portion 27 and the second cam-abutting portion 28 to each other, whereby the movement of the second normal intake cam 22c is transmitted from the second cam-abutting portion 28 to the second intake valve IV2 via the second valve-abutting portion 27. On the other hand, when the cylinder 29 is supplied with the hydraulic pressure, the connection pins 30 to 32 are moved toward the cylinder 29a against the urging force of the return spring 33 whereby they are received into the respective cylinders 29a to 29c. This disconnects between the second valve-abutting portion 27 and the second cam-abutting portion 28 to make these portions 27 and 28 free from each other, which causes only the second cam-abutting portion 28 to be actuated by the second normal intake cam 22c without transmitting the movement of the second normal intake cam 22c from the second cam-abutting portion 28 to the second valve-abutting portion 27.

It should be noted that the exhaust rocker arm 25 has almost the same construction as the second intake rocker arm 24, and is only distinguished from the same in that an oil passage for supplying hydraulic pressure to a cylinder thereof (neither of which is shown) communicates with the third oil passage 26c. Therefore, detailed description thereof will be omitted.

As shown in FIG. 4, the first intake cam rocker arm 23 is comprised of a first valve-abutting portion 35 in abutment with the first intake valve IV1, a first cam-abutting portion 36 in abutment with the first normal intake cam 22a, and a retarded-closing cam-abutting portion 37 in abutment with the retarded-closing intake cam 22b. The first valve-abutting portion 35 and the first cam-abutting portion 36 are constructed similarly to the second valve-abutting portion 27 and the second cam-abutting portion 28, described hereinabove, and therefore detailed description thereof is omitted while designating components and portions thereof using the same reference numerals. In FIG. 4, for clarity purposes, hatching of the first valve-abutting portion 35 and the first cam-abutting portion is omitted.

The retarded-closing cam-abutting portion 37 has a central portion thereof pivotally supported by the rocker arm shaft 26, an end thereof opposite from the first intake valve IV1 is in abutment with the retarded-closing intake cam 22b. Further, the first valve-abutting portion 35 and the retarded-closing cam-abutting portion 37 are formed with cylinders 38a and 38b which can be made continuous with each other, in respective portions thereof closer to the first intake valve IV1 with respect to the rocker arm shaft 26. Within these cylinders 38a and 38b, connection pins 39 and 40 are slidably disposed, respectively, and within the cylinder 38a is disposed a return spring 41 for urging the connection pins 39 and 40 toward the retarded-closing cam-abutting portion 37. Further, the retarded-closing cam-abutting portion 37 is formed with an oil passage 42 communicating between the first oil passage 26a of the rocker arm shaft 26 and the cylinder 38b.

With the above configuration, when the hydraulic pressure is not supplied from the oil pump 14 to the cylinder 38b via the first oil passage 26a, the urging force of the return spring 41 causes the connection pins 39 and 40 to be received within the cylinders 38a and 38b (state shown in FIG. 4), respectively. This disconnects between the first valve-abutting portion 35 and the retarded-closing cam-abutting portion 37 to make these portions 35 and 37 free from each other, which causes only the second retarded-closing cam-abutting portion 37 to be actuated by the retarded-closing intake cam 22b without transmitting the movement of the retarded-closing intake cam 22b from the retarded-closing cam-abutting portion 37 to the first valve-abutting portion 35. On the other hand, when the cylinder 38b is supplied with the hydraulic pressure, the connection pins 39 and 40 are moved toward the first valve-abutting portion 35 against the urging force of the return valve 41, whereby the connection pin 40 engages with both the first valve-abutting portion 35 and the retarded-closing cam-abutting portion 37 in a straddling manner, which connects between the first valve-abutting portion 35 and the retarded-closing cam-abutting portion 37.

In the valve actuating mechanism 21 constructed as described above, as shown in FIG. 6, the first and second intake valves IV1 and IV2 and the exhaust valve EV are actuated in the following three valve operating modes VTMODREQ:

1. Normal Mode VTMOD2

The supply of the hydraulic pressure to the rocker arms is inhibited.
  The first intake valve IV1 is actuated by the first normal intake cam 22a, the second intake valve IV2 by the second normal intake cam 22c, and the exhaust valve EV by the exhaust cam.

2. Retarded-Closing Mode VTMOD1

The first and second intake rocker arms 23 and 24 are supplied with the hydraulic pressure, and at the same time the supply of the hydraulic pressure to the exhaust rocker arm 25 is inhibited.
  The first intake valve IV1 is actuated by the retarded-closing intake cam 22b, with the second intake valve IV2 made idle, and the exhaust valve EV by the exhaust cam. This makes the valve-closing timing of the first intake valve IV1 more retarded than in the normal mode VTMOD2, i.e. sets the same to a predetermined crank angle (e.g. 80° C.) after the bottom dead center (BDC) position at the start of the compression stroke. The retarded-closing mode VTMOD1 is used when the engine 3 is in a low-load, low-rotational speed condition, for improvement of fuel economy, and in this case, a throttle valve, not shown, is controlled to open wider than in the normal mode VTMOD2.

3. Idle Mode VTMDOCS.

The second intake rocker arm 24 and the exhaust rocker arm 25 are supplied with the hydraulic pressure, and at the same time the first intake rocker arm 23 has only the first valve-abutting portion 35 thereof supplied with the hydraulic pressure.
  All the valves are made idle, i.e. held in closed position.

The ECU 2 is supplied with a signal indicative of an stepped-on amount (hereinafter referred to as "the accelerator pedal opening") AP of an accelerator pedal (not shown) from an accelerator pedal opening sensor 52, a signal indicative of the rotational speed (hereinafter referred to as "the crankshaft rotational speed") NE (operating condition of the vehicle) of the crankshaft 3a from a crankshaft rotational speed sensor 53 (operating condition-detecting means), and a signal indicative of a vehicle speed VP from a vehicle speed sensor 54.

The ECU 2 (operating condition-detecting means, driving fuel consumption amount-calculating means, recovering fuel consumption amount-calculating means, driven mode-setting means) is formed by a microcomputer including an I/O interface, a CPU, a RAM, and a ROM. The signals of the aforementioned various sensors 51 to 54 are input to the CPU each input to the CPU after A/D conversion and waveform shaping by the I/O interface.

The CPU determines operating conditions of the vehicle V based on these input signals, and sets the driven mode to the engine-driven mode or the motor-driven mode depending on the determined operating conditions of the vehicle V according to a control program read from the ROM and so forth, and at the same time, the valve operating mode VTMODREQ to the normal mode VTMOD2, the retarded-closing mode VTMOD1, or the idle mode VTMODCS. Further, according to the setting of the driven mode, the CPU controls operations of the engine 3, such as fuel injection, and driving and power generation of the electric motor 4.

Figure 7:
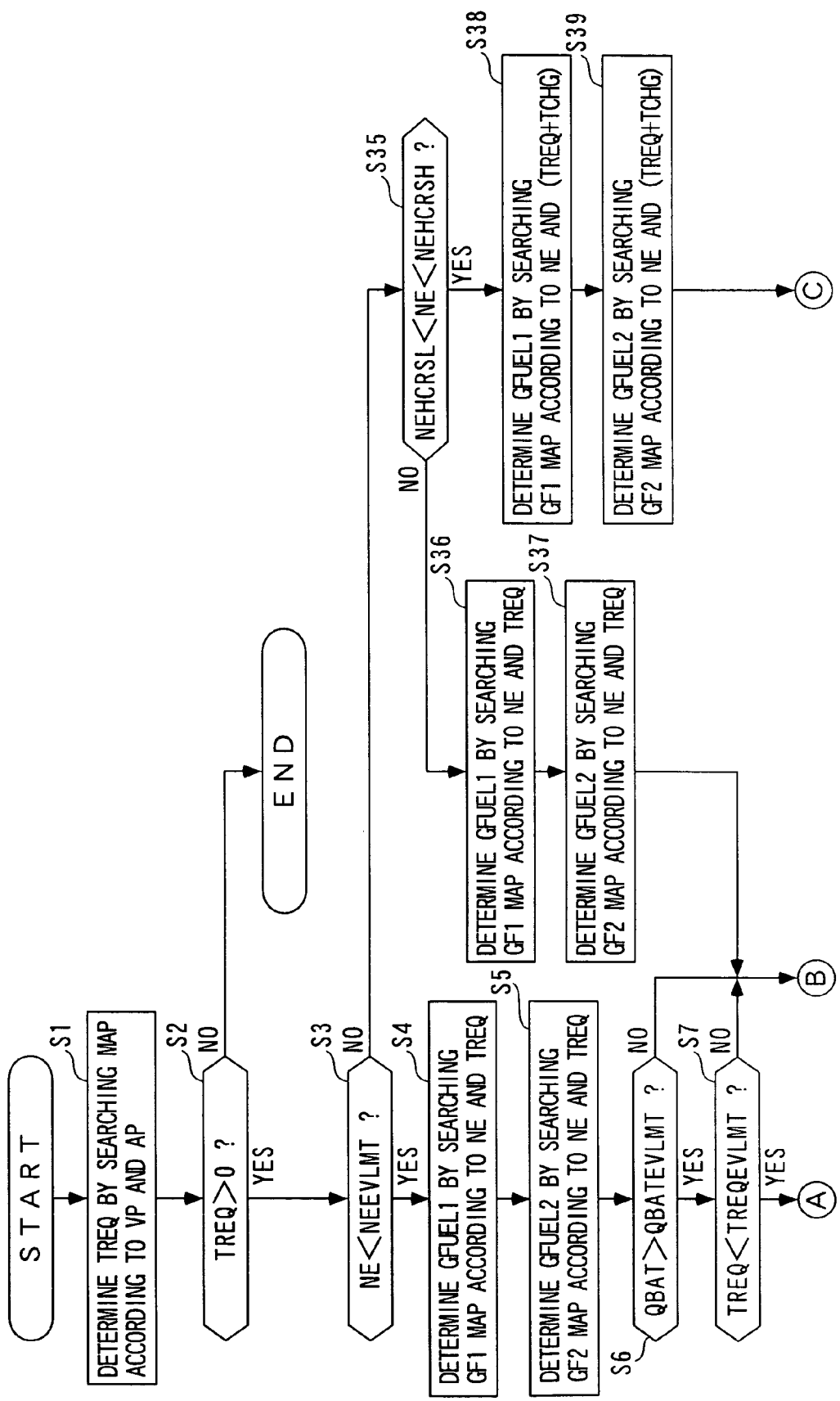
FIG. 7 is a flowchart showing a control process for determining a driven mode of the vehicle and a valve operating mode of the engine.
Figure 8:
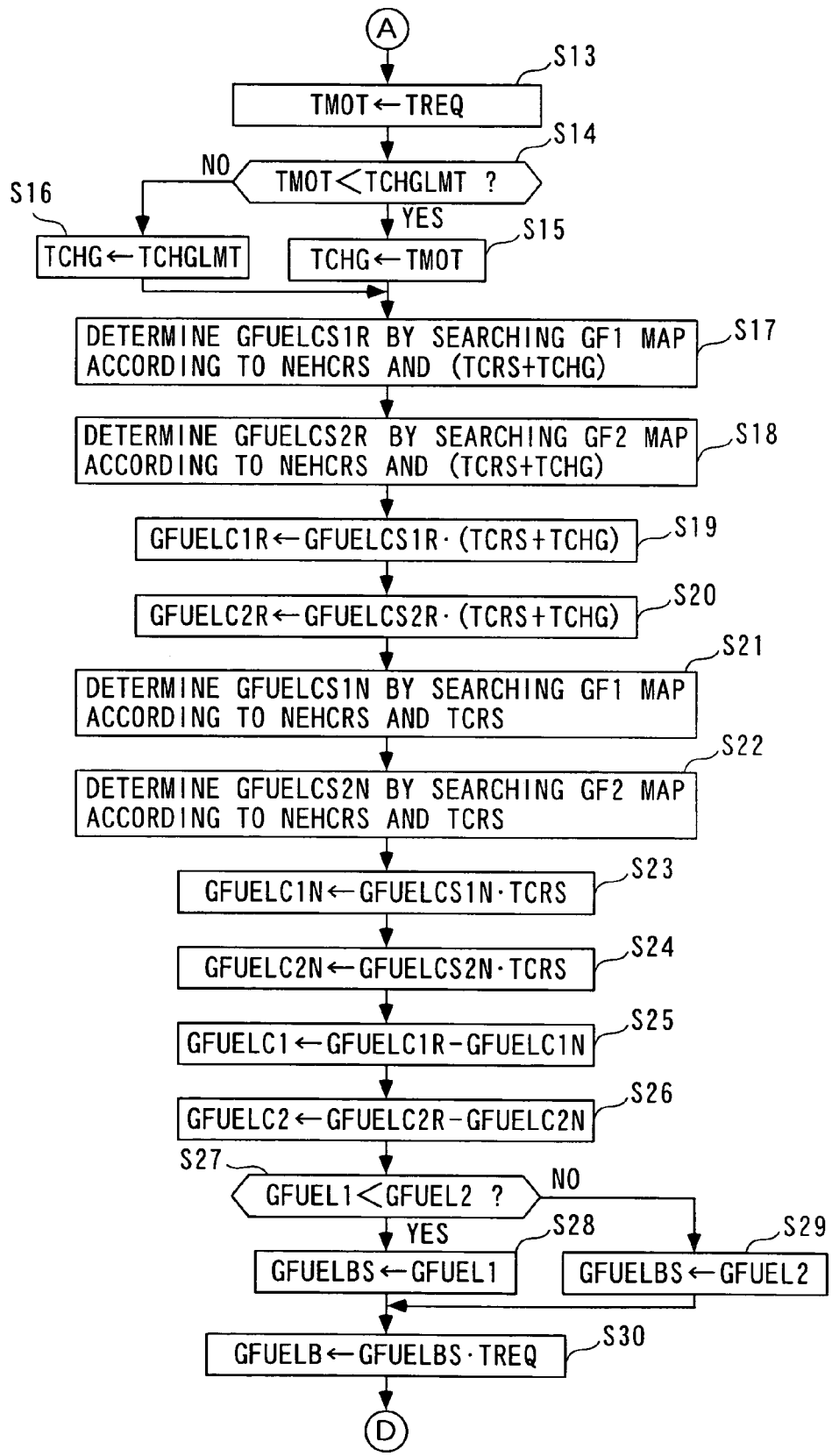
FIG. 8 is a flowchart showing a continued part of the control process, wherein the setting of a delayed-closing recovering fuel consumption amount and a normal recovering fuel consumption amount, etc. are carried out.
Figure 9:
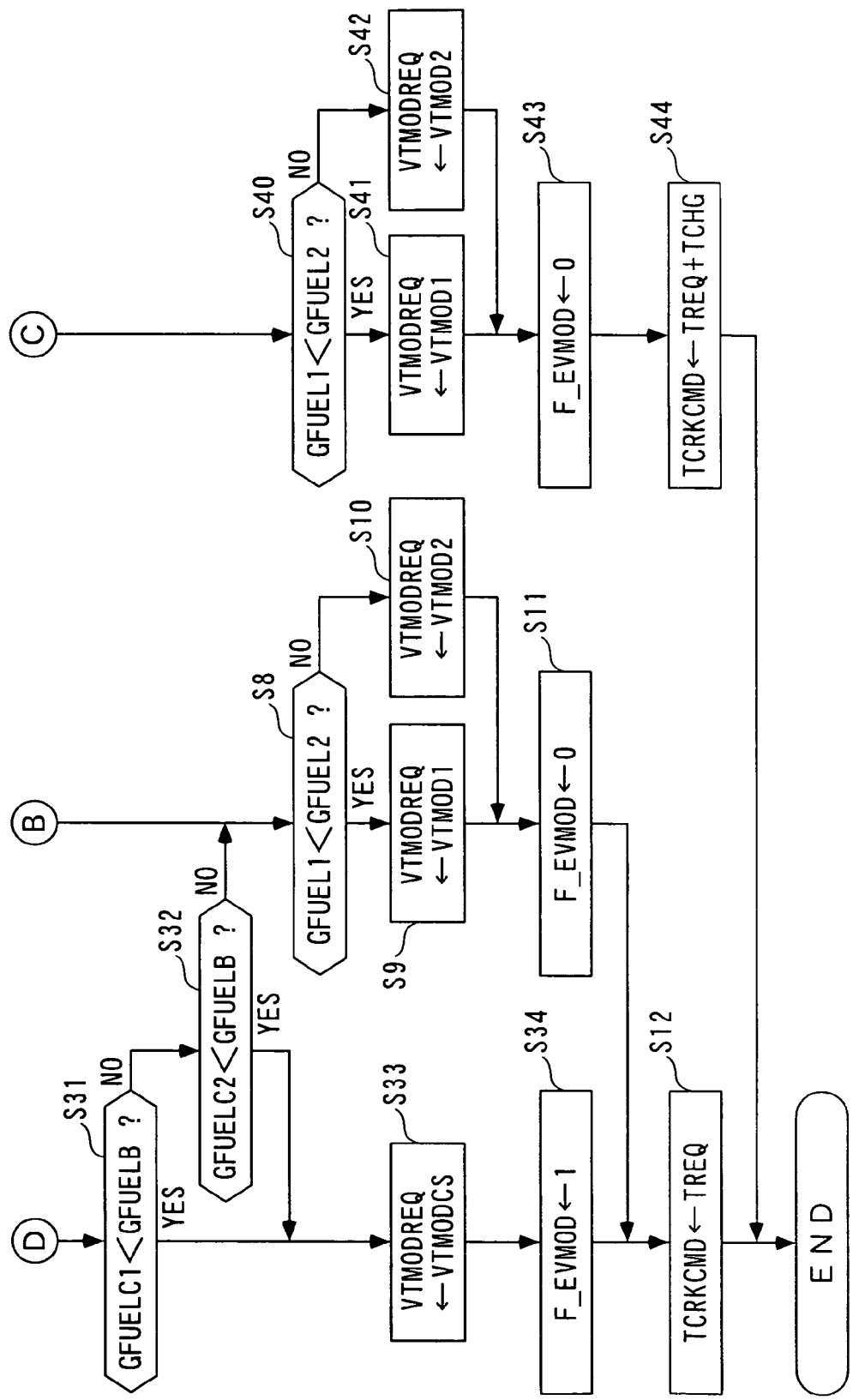
FIG. 9 is a flowchart showing the remaining part of the control process, wherein the driven mode and the valve operating mode are determined.
Figure 10:
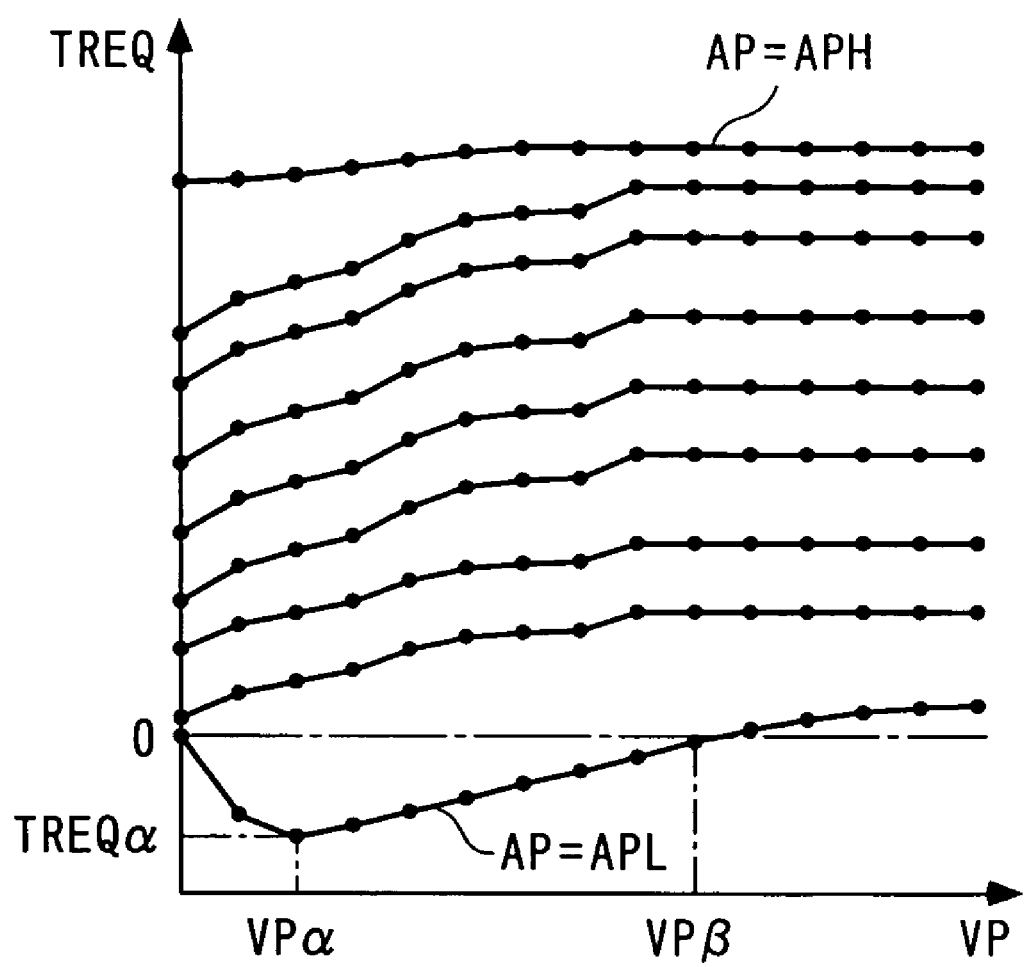
FIG. 10 is a diagram showing an example of a demanded torque setting map for use in the control process (FIG. 7 part)

FIGS. 7 to 9 shows a control process for determining and setting the driven mode of the vehicle V and the valve operating mode VTMODREQ. This process is executed at a predetermined time interval of e.g. 10 milliseconds. First, in a step 1 (shown as S1 in abbreviated form in FIG. 7; the following steps are also shown in abbreviated form), according to the vehicle speed VP and the accelerator pedal opening AP, a demanded torque setting map shown in FIG. 10 is searched to thereby determine the demanded torque TREQ (operating condition of the vehicle) demanded of the drive system of the vehicle V including the engine 3 and the electric motor 4.

In this map, values of the demanded torque TREQ are set in association with up to nine predetermined values of the accelerator pedal opening AP ranging from a predetermined lower limit value APL (e.g. 0°) and a predetermined higher limit value APH (e.g. 80°) and with fifteen grid points of the vehicle speed VP. When the accelerator pedal opening is not equal to any of these predetermined values or any of the grid points of the vehicle speed VP, the demanded torque TREQ is determined by interpolation calculation. Further, the demanded torque TREQ is set to a larger value as the accelerator pedal opening AP is larger. Further, when the accelerator pedal opening AP is larger than the lower limit value APL and at the same time the vehicle speed VP is within a low-to-medium speed range, the demanded torque TREQ is set to a larger value as the vehicle speed VP is higher, and when the vehicle speed VP is higher than this range, the demanded torque TREQ is set to a fixed value. This is because when the vehicle speed VP is high, traveling energy of the vehicle V is so large that unless the driver demands acceleration, i.e. unless the accelerator pedal is stepped on, the torque supplied to the driving wheels 6 need not be increased.

Further, in the demanded torque-setting map, when the accelerator pedal opening AP is smaller than the lower limit value APL, values of the demanded torque TREQ are set according to the vehicle speed VP as follows: When the vehicle speed VP is 0, the demanded torque TREQ is set to a value of 0, and when the vehicle speed VP is within a range of a value of 0 to a first predetermined value VPα (e.g. 20 km/h), the demanded torque TREQ is set to a negative value whose absolute value is larger as the vehicle speed VP is higher. When the vehicle speed VP is within a range of the first predetermined value VPα to a second predetermined value VPβ (e.g. 90 km/h), the demanded torque TREQ is set to a negative value whose absolute value is smaller as the vehicle speed VP is higher, and when the vehicle speed is equal to the first predetermined value VPα, the demanded torque TREQ is set to the minimum value TREQα (e.g. −1 kgf·m). Further, when the vehicle speed VP is higher than the second predetermined value VPβ, the demanded torque TREQ is set to a positive value whose absolute value is larger as the vehicle speed VP is higher. This is because when the vehicle speed VP is higher than the second predetermined value VPβ, if the demanded torque TREQ is set to a negative value, there is a fear of degradation of drivability.

Next, it is determined in a step 2 whether or not the demanded torque TREQ determined in the step 1 is larger than a value of 0. If the answer to this question is negative (NO), i.e. TREQ≦0 holds, it is determined that the vehicle is not in a condition for driving the vehicle V, and the present process is terminated immediately.

On the other hand, if the answer to the question of the step 2 is affirmative (YES), i.e. if TREQ>0 holds, it is determined in a step 3 whether or not the crankshaft rotational speed NE is lower than a predetermined lower limit value NEEVLMT (e.g. 1500 rpm). If the answer to this question is affirmative (YES), it is judged that the vehicle V is in an operating condition drivable by the electric motor 4, and the process proceeds to a step 4, wherein a GF1 map shown in FIG. 11 is searched according to the crankshaft rotational speed NE and the demanded torque TREQ, to determine a map value GF1, and set the value to a retarded-closing drive-time fuel consumption ratio GFUEL1 (driving fuel consumption amount). The retarded-closing drive-time fuel consumption ratio GFUEL1 represents a fuel consumption ratio to be exhibited when the engine 3 is operated in the retarded-closing mode VTMOD1.

This GF1 map is formed by determining values of the fuel consumption ratio to be exhibited when the engine 3 is driven in the retarded-closing mode VTMOD1, by experiment, and associating them with respective values of the crankshaft rotational speed NE and the demanded torque TREQ. In the GF1 map, a very low-to-medium speed range of the crankshaft rotational speed NE and the entire range i.e. very low-to-high load range of the demanded torque TREQ are divided to define nine regions to which predetermined values of the map value GF1 are set, respectively. More specifically, the map value GF1 is set to the minimum value GF1MIN (e.g. 220 g/PSh) in a low rotational speed-and-medium load region, and set to a larger value as the crankshaft rotational speed NE is larger and the demanded torque TREQ is smaller. In a region where the crankshaft rotational speed NE is in a medium rotational range and the demanded torque TREQ is in a very low-to-low load range, the map value GF1 is set to the maximum value GF1MAX (e.g. 380 g/PSh).

Next, in a step 5, a map value GF2 is determined by searching a GF2 map shown in FIG. 12 according to the crankshaft rotational speed NE and the demanded torque TREQ and set to a normal drive-time fuel consumption ratio GFUEL2 (driving fuel consumption amount). The normal drive-time fuel consumption ratio GFUEL2 represents a fuel consumption ratio to be exhibited when the engine 3 is driven in the normal mode VTMOD2.

The GF2 map is formed by determining values of the fuel consumption ratio to be exhibited when the engine 3 is driven in the normal mode VTMOD2, by experiment. Similarly to the GF1 map shown in FIG. 11, the GF2 map is divided according to the crankshaft rotational speed NE and the demanded torque TREQ, into six regions to which predetermined values of the map value GF2 are set, respectively. More specifically, when the crankshaft rotational speed NE is in a low-to-medium speed range and the demanded torque TREQ is in a medium load range, the map value GF2 is set to the minimum value GF2MIN (e.g. 240 g/PSh), and as the demanded torque TREQ is smaller, the map value GF2 is set to a larger value. When the crankshaft rotational speed NE is in a very low-to-medium speed range and the demanded torque TREQ is in a very low load range, the map value GF2 is set to the maximum value GF2MAX (e.g. 340 g/PSh).

As described above, the GF1 map and the GF2 map are different in values and distribution thereof. For example, the minimum value GF1MIN of the map value GF1 in the retarded-closing mode VTMOD1 is smaller than the minimum value GF2MIN of the map value GF2 in the normal mode VTMOD2, and is obtained on a lower crankshaft rotational speed side than the minimum value GF2MIN is obtained. This is because in the retarded-closing mode VTMOD1, as described above, the valve-closing timing of the first intake valve IV1 is retarded and at the same time the throttle valve is controlled to open wider whereby the mixture drawn into the cylinders (not shown) of the engine 3 is returned into an intake pipe (not shown) during the compression stroke to reduce the mixture without throttling the throttle valve, which reduces pumping loss caused by throttling of the throttle valve, and improves fuel economy in the low rotational speed of the engine 3 by the reduced pumping loss.

Referring again to FIG. 7, in a step 6 following the step 5, it is determined whether or not the remaining change QBAT of the battery 8 is larger than a predetermined lower limit value QBATEVLMT (e.g. 50%). If the answer to this question is negative (NO), it is judged that the vehicle V is not in a condition suitable for the motor-driven mode due to insufficiency of the remaining change QBAT, so that the process proceeds to a step 8 in FIG. 9.

On the other hand, if the answer to the question of the step 6 is affirmative (YES), i.e. if QBAT>QBATEVLMT holds, it is determined in a step 7 whether or not the demanded torque TREQ is smaller than a predetermined upper limit value TREQEVLMT (e.g. 7 kgf·m). If the answer to this question is negative (NO), it is judged that the engine 3 is not in a condition suitable for the motor-driven mode since the demanded torque TREQ exceeds an upper limit which can be output by the electric motor 4, so that the process proceeds to the step 8.

In the step 8, it is determined whether or not the retarded-closing drive-time fuel consumption ratio GFUEL1 set in the step 4 is smaller than the normal drive-time fuel consumption ratio GFUEL2 set in the step 5. If the answer to this question is affirmative (YES), the valve operating mode VTMODREQ is set to the retarded-closing mode VTMOD1 (step 9), whereas if this answer is negative (NO), the valve operating mode VTMODREQ is set to the normal mode VTMOD2 (step 10). Next, the driven mode is set to the engine-driven mode, and to indicate the setting, a motor-driven mode execution flag F_EVMOD is set to 0 (step 11), and at the same time, the demanded torque TREQ is set to a target torque TCRKCMD (step 12), followed by terminating the process.

As described, when the operating conditions of the vehicle V are not suitable for the motor-driven mode and therefore the driven mode is set to the engine-driven mode, the valve operating mode VTMODREQ is set to one of the retarded-closing mode VTMOD1 and the normal mode VTMOD2 which gives the lower fuel consumption ratio.

On the other hand, if the answer to the question of the step 7 is affirmative (YES), i.e. if TREQ<TREQEVLMT holds, it is judged that the demanded torque TREQ can be output by the electric motor 4, so that the process proceeds to a step 13 in FIG. 8, wherein the demanded torque TREQ is set to motor-demanded torque TMOT demanded of the electric motor 4. The motor-demanded torque TMOT corresponds to an amount of electric energy to be consumed when the vehicle V is driven in the motor-driven mode. Then, the process proceeds to a step 14, wherein it is determined whether or not the set motor-demanded torque TMOT is smaller than a predetermined upper limit value TCHGLMT (e.g. 3 kgf·m) (predetermined value). If the answer to this question is affirmative (YES), the charging torque TCHG is set to the motor-demanded torque TMOT (step 15). On the other hand, if the answer to the question of the step 14 is negative (NO), i.e. if TMOT≧TCHGLMT holds, the charging torque TCHG is set to the predetermined upper limit value TCHGLMT (step 16).

Then, in a step 17 following the step 15 or 16, a retarded-closing charging-time fuel consumption ratio GFUELCS1R is calculated. The retarded-closing charging-time fuel consumption ratio GFUELCS1R represents a fuel consumption ratio to be exhibited when the engine 3 is operated in the retarded-closing mode while conducting cruising charging in which electric energy to be consumed for outputting the motor-demanded torque TMOT is generated and stored in the battery 8 during cruising of the vehicle V. Therefore, the retarded-closing charging-time fuel consumption ratio GFUELCS1R is set to the map value GF1 determined by searching the GF1 map in FIG. 11 using a predetermined cruising rotational speed NEHCRS (e.g. 2500 rpm) as the crankshaft rotational speed NE, and the sum of a predetermined cruising torque TCRS (e.g. 5 kgf·m) and the charging torque TCHG set in the step 15 or 16 as the demanded torque TREQ.

It should be noted that in the steps 14 to 16, the charging torque TCHG is limited to the upper limit value TCHGLMT, because there is a limit to torque to be added for the cruising charging, since it is necessary to secure an excellent drivability.

Next, in a step 18, a normal charging-time fuel consumption ratio GFUELCS2R is determined which represents a fuel consumption ratio to be exhibited when the engine 3 is operated in the normal mode VTMOD2 while conducting the cruising charging. More specifically, similarly to the step 17, the map value GF2 is determined by searching the GF2 map in FIG. 12 using the cruising rotational speed NEHCRS and the sum of the cruising torque TCRS and the charging torque TCHG, and set to the normal charging-time fuel consumption ratio GFUELCS2R.

Then, in a step 19, a retarded-closing charging-time fuel consumption amount GFUELCS1R which is to be consumed when the cruising charging is performed in the retarded-closing mode VTMOD1 is calculated by multiplying the retarded-closing charging-time fuel consumption ratio GFUELCS1R set in the step 17 by the sum of the cruising torque TCRS and the charging torque TCHG. Similarly, in a step 20, a normal charging-time fuel consumption amount GFUELC2R which is to be consumed when the cruising charging is performed in the normal mode VTMOD2 is calculated by multiplying the normal charging-time fuel consumption ratio GFUELCS2R set in the step 18 by the sum of the cruising torque TCRS and the charging torque TCHG.

Next, in a step 21, a retarded-closing cruising-time fuel consumption ratio GFUELCS1N is determined which represents a fuel consumption ratio to be exhibited when the engine 3 is operated to performing only cruising in the retarded-closing mode VTMOD1 without conducting the cruising charging. More specifically, the map value GF1 is determined by searching the GF1 map using the cruising rotational speed NEHCRS and the cruising torque TCRS, and set to the retarded-closing cruising-time fuel consumption ratio GFUELCS1N.

Similarly, in a step 22, the map value GF2 determined by searching the GF2 map using the cruising rotational speed NEHCRS and the cruising torque TCRS is set to a normal closing-time fuel consumption ratio GFUELCS2N which represents a fuel consumption ratio to be exhibited when the engine 3 is operated to perform only cruising in the normal mode VTMOD2.

Next, in a step 23, a retarded-closing cruising-time fuel consumption amount GFUELC1N which is to be consumed when the cruising is performed in the retarded-closing mode VTMOD1 is calculated by multiplying the retarded-closing cruising-time fuel consumption ratio GFUELCS1N set in the step 21 by the cruising torque TCRS. Similarly, in a step 24, a normal cruising-time fuel consumption amount GFUELC2N which is to be consumed when the cruising is performed in the normal mode VTMOD2 is calculated by multiplying the normal cruising-time fuel consumption ratio GFUELCS2N by the cruising torque TCRS.

Then, in a step 25, a retarded-closing recovering fuel consumption amount GFUELC1 (recovering fuel consumption amount) is calculated by subtracting the retarded-closing cruising-time fuel consumption amount GFUELC1N set in the step 23 from the retarded-closing charging-time fuel consumption amount GFUELC1R set in the step 19. Then, the process proceeds to a step 26, wherein a normal recovering fuel consumption amount GFUELC2 (recovering fuel consumption amount) is calculated by subtracting the normal cruising-time fuel consumption amount GFUELC2N set in the step 24 from the normal charging-time fuel consumption amount GFUELC2R set in the step 20. As is obvious from the calculation methods described above, these retarded-closing and normal recovering fuel consumption amounts GFUELC1 and GFUELC2 correspond to fuel consumption amounts required for power generation when the cruising charging is carried out in the retarded-closing mode VTMOD1 and the normal mode VTMOD2, respectively.

Then, it is determined in a step 27 whether or not the retarded-closing drive-time fuel consumption ratio GFUEL1 set in the step 4 is smaller than the normal drive-time fuel consumption ratio GFUEL2 set in the step 5. If the answer to this question is affirmative (YES), the retarded-closing drive-time fuel consumption ratio GFUEL1 is set to a minimum drive-time fuel consumption ratio GFUELBS (step 28), and then the process proceeds to a step 30, whereas if the answer to the above question is negative (NO), i.e. if GFUEL1≧GFUEL2 holds, the normal drive-time fuel consumption ratio GFUEL2 is set to the minimum drive-time fuel consumption ratio GFUELBS (step 29), and then the process proceeds to the step 30.

In this step 30, a driving fuel consumption amount GFUELB is calculated by multiplying the minimum drive-time fuel consumption ratio GFUELBS set in the step 28 or 29 by the demanded torque TREQ. As is obvious from the calculation method of the driving fuel consumption amount GFUELB, the driving fuel consumption amount GFUELB corresponds to the smaller one of the fuel consumption amounts calculated assuming that the engine 3 is operated in the retarded-closing mode VTMOD1 and the normal mode VTMOD2, respectively.

Then, in a step 31 in FIG. 9, it is determined whether or not the retarded-closing recovering fuel consumption amount GFUELC1 set in the step 25 is smaller than the driving fuel consumption amount GFUELB set in the step 30. If the answer to this question is negative (NO), it is determined in a step 32 whether or not the normal recovering fuel consumption amount GFUELC2 set in the step 26 is smaller than the driving fuel consumption amount GFUELB. If the answer to this question is negative (NO), i.e. if the driving fuel consumption amount GFUELB is the smallest, it is judged that the vehicle V should be driven by the engine 3, and the steps 8 et seq. are executed, whereby the valve operating mode VTMODREQ is set to one of the retarded-closing mode VTMOD1 and the normal mode VTMOD2 which gives the smaller fuel consumption amount.

On the other hand, if the answer to the question of the step 31 or 32 is affirmative (YES), i.e. if GFUELC1<GFUELB or GFUELC2<GFUELB holds, it is judged that the vehicle V should be driven by the electric motor 4, and the valve operating mode VTMODREQ is set to the idle mode VTMODCS (step 33). Further, the driven mode is set to the motor-driven mode and to indicate the setting, the motor-driven mode execution flag F_EVMOD is set to 1 (step 34), and the step 12 is executed, followed by terminating the present process.

As described above, according to the demanded torque TREQ and the crankshaft rotational speed NE, the fuel consumption ratios to be exhibited when the engine 3 is operated in the retarded-closing mode VTMOD1 and the normal mode VTMOD2, respectively, are calculated as the retarded-closing drive-time fuel consumption ratio GFUEL1 and the normal drive-time fuel consumption ratio GFUEL2 (steps 4 and 5), and using the smaller one of the ratios, the fuel consumption amount to be consumed when the vehicle V is driven in the engine-driven mode is calculated as the driving fuel consumption amount GFUELB (step 30).

On the other hand, net fuel consumption amounts required to generate and store electric energy to be consumed when the vehicle V is driven by the electric motor 4, by the cruising charging, in the retarded-closing mode VTMOD1 and the normal mode VTMOD2 are calculated, respectively, as the retarded-closing recovering fuel consumption amount GFUELC1 (step 25) and the normal recovering fuel consumption amount GFUELC2 (step 26). Then, when either of the retarded-closing recovering fuel consumption amount GFUELC1 and the normal recovering fuel consumption amount GFUELC2 is smaller than the driving fuel consumption amount GFUELB, the valve operating mode VTMODREC is set to the idle mode VTMODCS (step 33), and the driven mode is set to the motor-driven mode (step 34). Further, in the other cases (GFUELB≦GFUELC1/2), the retarded-closing drive-time fuel consumption ratio GFUEL1 and the normal drive-time fuel consumption ratio GFUEL2 are compared with each other, and one of the valve operating modes VTMODREQ which gives the smaller fuel consumption amount is employed (steps 8 to 10) and at the same time the driven mode is set to the engine-driven mode (step 11). Further, the charging torque TCHG used for determining the retarded-closing and normal recovering fuel consumption amounts GFUELC1 and GFUELC2 is set to the upper limit value TCHGLMT (steps 14 to 16).

Referring again to FIG. 7, if the answer to the question of the step 3 is negative (NO), i.e. if NE≧NEEVLMT holds, it is judged that the vehicle V is not in a condition drivable by the electric motor 4, so that the process proceeds to a step 35, wherein it is determined whether or not the crankshaft rotational speed NE is higher than a predetermined charging lower limit value NEHCRSL (e.g. 2000 rpm) and at the same time lower than a predetermined charging upper limit value NEHCRSH (e.g. 3000 rpm). If the answer to this question is negative (NO), it is judged that the cruising charging cannot be properly performed, so that the program proceeds to a step 36. This is because if the crankshaft rotational speed NE is too low, the power generation using the electric motor 4 cannot be sufficiently performed and if the same is too high, there is a fear of degradation of drivability due to additional load placed on the engine for the power generation.

In the step 36, similarly to the step 4, the map value GF1 is determined by searching the GF1 map in FIG. 11 according to the crankshaft rotational speed NE and the demanded torque TREQ, and set to the retarded-closing drive-time fuel consumption ratio GFUEL1. Then, similarly to the step 5, the map value GF2 is determined by searching the GF2 map in FIG. 12 according to the crankshaft rotational speed NE and the demanded torque TREQ, and set to the normal drive-time fuel consumption ratio GFUEL2 (step 37), and the steps 8 et seq. are executed, followed by terminating the present process. As described above, even when the cruising charging cannot be performed, by executing the steps 8 to 11, one of the valve operating modes VTMODREQ which gives the smaller fuel consumption amount is employed.

On the other hand, if the answer to the question of the step 35 is affirmative (YES), i.e. if NEHCRSL<NE<NEHCRSH holds, it is judged that the cruising charging should be performed, so that the process proceeds to a step 38, wherein the map value GF1 is determined by searching the GF1 map in FIG. 11 according to the crankshaft rotational speed NE and the sum of the demanded torque TREQ and the charging torque TCHG set in the step 15 or 16, and set to the retarded-closing drive-time fuel consumption ratio GFUEL1.

Then, in a step 39, similarly to the step 38, a map value GF2 is determined by searching the GF2 map in FIG. 12 according to the crankshaft rotational speed NE and the sum of the demanded torque TREQ and the charging torque TCHG, and set to the normal drive-time fuel consumption ratio GFUFL2.

Next, the process proceeds to a step 40 in FIG. 9, wherein it is determined whether or not the retarded-closing drive-time fuel consumption ratio GFUEL1 set in the step 38 is smaller than the normal drive-time fuel consumption ratio GFUEL2 set in the step 39. If the answer to this question is affirmative (YES), the valve operating mode VTMODREQ is set to the retarded-closing mode VTMOD1 (step 41), whereas if the same is negative (NO), the valve operating mode VTMODREQ is set to the normal mode VTMOD2 (step 42).

In a step 43 following the step 41 or 42, the driven mode is set to the engine-driven mode, and the motor-driven mode flag F_EVMOD is set to 0. Then, the process proceeds to a step 44, wherein the sum of the demanded torque TREQ and the charging torque TCHG is set to the target torque TCRKCMD, followed by terminating the process.

As described above, with the arrangement of the present embodiment, according to the crankshaft rotational speed NE and the demanded torque TREQ, the retarded-closing and normal drive-time fuel consumption ratios GFUEL1 and GFUEL2 are calculated, and the smaller one of the two ratios is used to calculate an amount of fuel to be consumed when the vehicle is driven in the engine-driven mode, as the drive-time fuel consumption amount GFUELB. On the other hand, net amounts of fuel required to generate and store electric energy to be consumed when the vehicle V is driven by the electric motor 4, by the cruising charging in the retarded-closing mode VTMOD1 and the normal mode VTMOD2, are calculated, respectively, as the retarded-closing recovering fuel consumption amount GFUELC1 and the normal recovering fuel consumption amount GFUELC2. Then, if the retarded-closing or normal recovering fuel consumption amount GFUELC1/2<the driving fuel consumption amount GFUELB holds, the driven mode is set to the motor-driven mode, whereas if the retarded-closing or normal recovering fuel consumption amount GFUELC1/2≧the driving fuel consumption amount GFUELB holds, the driven mode is set to the engine-driven mode. This makes it possible to optimally select one of the driven modes which ensures more excellent fuel economy, and hence the fuel economy can be improved.

Further, as the driven mode is set to the engine-driven mode, the retarded-closing drive-time fuel consumption ratio GFEUL1 and the normal drive-time fuel consumption ratio GFUEL2 are compared with each other, and one of the valve operating modes VTOMODREQ which gives the smaller fuel consumption amount is employed, which makes it possible to further improve fuel economy. Moreover, when the cruising charging can be executed, the fuel consumption ratios to be exhibited when the cruising charging is performed in the retarded-closing mode VTMOD1 and the normal mode VTMOD2 are calculated, respectively, as the retarded-closing drive-time fuel consumption ratio GFUEL1 and the normal drive-time fuel consumption ratio GFUEL2 (steps 38 and 39), and compared with each other, and one of the valve operating modes VTMODREQ which gives the smaller fuel consumption amount is employed (steps 40 to 42), which makes it possible to further improve fuel economy. Furthermore, since the charging torque TCHG is limited to the upper limit value TCHGLMT, the normal recovering fuel consumption amount GFUELC1 and the retarded-closing recovering fuel consumption amount GFUELC2 can be properly set.

It should be noted that the present invention is by no means limited to the preferred embodiment described above, but it can be practiced in various forms. For example, although in the preferred embodiment described above, the invention is applied to the engine 3 which is capable of selectively switching the valve operating mode VTMODREQ between the retarded-closing mode VTMOD1 and the normal mode VTMOD2, this is not limitative, but the present invention can be applied to any suitable engine so long as the engine is operated while selecting between a plurality of operating modes different in fuel consumption ratio. For example, the present invention can be applied to an engine which is operated in a selected one of a plurality of operating modes which gives different fuel consumption ratios due to different valve lifts made variable between the operating modes.

It is further understood by those skilled in the art that the foregoing is a preferred embodiment of the invention, and that various changes and modifications may be made without departing from the spirit and scope thereof.

What is claimed is:

1. A control system for a hybrid vehicle that is operated while switching a driven mode between an engine-driven mode in which the hybrid vehicle is driven by an internal combustion engine and a motor-driven mode in which the hybrid vehicle is driven by an electric motor, and is capable of recovering electric energy for driving the electric motor, using the output from the engine, during the engine-driven mode, the control system comprising:

operating condition-detecting means for detecting operating conditions of the hybrid vehicle;

driving fuel consumption amount-calculating means for calculating a driving fuel consumption amount of the engine required for driving the hybrid vehicle in the engine-driven mode, based on the detected operating conditions of the hybrid vehicle;

recovering fuel consumption amount-calculating means for calculating a recovering fuel consumption amount of the engine required for recovering electric energy to be consumed when the hybrid vehicle is driven in the motor-driven mode, based on the detected operating conditions of the hybrid vehicle; and driven mode-setting means responsive to a result of comparison between the recovering fuel consumption amount calculated by said recovering fuel consumption amount-calculating means and the driving fuel consumption amount calculated by said driving fuel amount-calculating means, for setting the driven mode to the motor-driven mode when the recovering fuel consumption amount is smaller than the driving fuel consumption amount, and to the engine-driven mode when the recovering fuel consumption amount is larger than the driving fuel consumption amount.

2. A control system as claimed in claim 1, wherein the engine is configured such that the engine is selectively driven in one of a plurality of operating modes which give respective different fuel consumption ratios, and wherein said driving fuel consumption amount-calculating means calculates a plurality of driving fuel consumption amounts for the respective operating modes, as the driving fuel consumption amount, and wherein said driven mode-setting means uses a smallest one of the plurality of driving fuel consumption amounts calculated by said driving fuel consumption amount-calculating means, as the driving fuel consumption amount to be compared with the recovering fuel consumption amount.

3. A control system as claimed in claim 2, wherein said recovering fuel consumption amount-calculating means calculates a plurality of recovering fuel consumption amounts for the respective operating modes, as the recovering fuel consumption amount, and wherein said driven mode-setting means uses a smallest one of the plurality of recovering fuel consumption amounts calculated by said recovering fuel consumption amount-calculating means, as the recovering fuel consumption amount to be compared with the driving fuel consumption amount.

4. A control system as claimed in claim 3, wherein said recovering fuel consumption amount-calculating means calculates the recovering fuel consumption amount such that load on the engine necessary for recovering the electric energy does not exceed a predetermined value.

5. A control system as claimed in claim 2, wherein said recovering fuel consumption amount-calculating means calculates the recovering fuel consumption amount such that load on the engine necessary for recovering the electric energy does not exceed a predetermined value.

6. A control system as claimed in claim 2, wherein the engine has an intake valve, and wherein the plurality of operating modes includes a normal operating mode in which the intake valve is actuated such that the intake valve closes in normal closing timing, and a retarded-closing operating mode in which the intake valve is actuated such that the intake valve closes in timing more retarded than in the normal operating mode.

7. A control system as claimed in claim 1, wherein said recovering fuel consumption amount-calculating means calculates the recovering fuel consumption amount such that load on the engine necessary for recovering the electric energy does not exceed a predetermined value.

8. A control system as claimed in claim 1, wherein the operating conditions of the vehicle based on which the recovering fuel consumption amount and the driving fuel consumption amount are calculated include a rotational speed of the engine and torque demanded of the engine.

* * * * *